Dec. 12, 1961     E. WILDHABER     3,012,480
METHOD AND APPARATUS FOR CUTTING GEARS
Filed Oct. 4, 1955     5 Sheets-Sheet 1

INVENTOR:
E. WILDHABER
BY
Attorney

Dec. 12, 1961 E. WILDHABER 3,012,480
METHOD AND APPARATUS FOR CUTTING GEARS
Filed Oct. 4, 1955 5 Sheets-Sheet 2

*INVENTOR:*
E. WILDHABER
BY
*Attorney*

Dec. 12, 1961  E. WILDHABER  3,012,480
METHOD AND APPARATUS FOR CUTTING GEARS
Filed Oct. 4, 1955  5 Sheets-Sheet 3

INVENTOR:
E. WILDHABER
BY
*Attorney*

FIG. 18

Dec. 12, 1961     E. WILDHABER     3,012,480

METHOD AND APPARATUS FOR CUTTING GEARS

Filed Oct. 4, 1955     5 Sheets—Sheet 5

*INVENTOR:*
E. WILDHABER
BY *[signature]*
Attorney

United States Patent Office 3,012,480
Patented Dec. 12, 1961

3,012,480
METHOD AND APPARATUS FOR
CUTTING GEARS
Ernest Wildhaber, 124 Summit Drive, Rochester, N.Y.
Filed Oct. 4, 1955, Ser. No. 538,399
14 Claims. (Cl. 90—10)

The present invention relates to a method and to apparatus for cutting gears, and more particularly to a method and apparatus for form-cutting gears in a reciprocating process with a plurality of form-cutting tools. More specifically the invention relates to a method and to apparatus for form-cutting cylindrical gears having straight or helical teeth.

Heretofore in form-cutting spur and helical gears with a plurality of form-cutting tools the conventional practice has been to employ as many tools as there are tooth spaces in the gear to be cut, to reciprocate the tools axially relative to the work, and to feed the tools radially toward the work so that each tool is fed along the center line of the tooth space being cut by that tool. Furthermore in the conventional practice each tool enters the same tooth space on successive cutting strokes and continues to cut successively to greater depth in that tooth space until the tooth space is finished. Furthermore, in the known method each tool cuts on both of its sides and its tip on each cutting stroke.

The prior known method of form-cutting gears has the disadvantage, particularly in cutting helical gears, of variation in cutting clearance along the height of the cutting profiles. The tool clearance depends on the profile angle at any considered point of the tool profile. The effective relief or clearance, that is, the relief or clearance in the normal section increases with increasing profile angle. It is smallest near the tip of the tool where the profile inclination is smallest. When cutting gears from the solid metal this portion has to clear the helical tooth surface cut thereby near the beginning of the cut near the outside or tips of the gear teeth. In this region the helix angle of the helical surface is larger than at the pitch surface. The increase in helix angle is most pronounced on pinions and especially on pinions with long addendum teeth. To enable the tool to cut freely also in this position so much relief may have to be provided on the tool used in conventional manner that it does not stand up long enough in use and is impractical.

One object of the present invention is to provide a method of form-cutting gears which will effect a cleaner cut by confining the cutting to one side and the tip of each cutting tool so that chips produced by the tool do not get in each other's way.

A further object of the present invention is to provide a method for form-cutting gears that permits of cutting helical teeth without requiring excessive relief on the tools.

A further object of the invention is to provide a method of form-cutting gear teeth with tools fed depthwise that is both rapid and accurate, and that permits of using fewer tools than there are tooth spaces in the gear blank so that the tools can be held rigidly and are not in each other's way even when the tooth pitch is fine.

Still another object of the invention is to provide a method adapted to employ a plurality of groups of cutting tools for simultaneously cutting a gear blank where each group contains different cutting blades that operate simultaneously in different tooth spaces of the gear blank.

A further object of the invention is to provide apparatus and a machine for carrying out the process of the present invention.

Other objects of the invention will be apparent hereinafter from the specification and from the recital of the appended claims.

Several different embodiments of the invention are illustrated in the appended drawings, in which.

In the process of the present invention a reciprocating motion is provided between the tools and a gear blank in a direction of the teeth to be cut in the blank. On spur gears having straight teeth this motion is in the direction of the axis of the gear blank. On helical gears the reciprocating motion is along and about the axis of the gear blank so that the tools describe a helical path relative to the gear blank and move in the direction of the helical teeth to be cut. On cylindrical gears, spur gears as well as helical gears, the reciprocation is preferably performed by the workpiece, that is, by the gear blank. Depthwise feed is provided between the tools and the gear blank, either continuously and very slowly, or preferably stepwise during the return strokes of the tools. On cylindrical gears this feed is performed by the tools; and the tools are clamped in the position, to which they have previously been fed, during the cutting strokes when intermittent feed is used.

Preferably the tools have side cutting edges that coincide with the gear tooth surfaces in the final position of depth feed. These edges are form-cutting edges, usually concavely curved, adapted to sweep the entire working surfaces of the gear teeth in full-depth cutting position, thereby to apply a form cut to the working surfaces of the teeth.

In contrast to conventional practice, the depthwise feed in the method of the present invention is in a direction inclined to the center line of the tooth space in which each side-cutting tool operates. Furthermore the present invention distinguishes from the conventional method in that the gear blank is preferably turned on its axis from stroke to stroke so that the tool enters a different tooth space after each cutting stroke.

With the feed in a direction inclined to the center line of the tooth space a cutting face of such inclination or rake may be provided on each tool as to attain an extra keen edge on the tip and one side cutting edge of the tool. This is not possible when both sides and tip of the tool have to be provided with cutting edges.

With the present invention improved tool clearance is obtainable in cutting helical teeth.

Referring now to the drawings by numerals of reference, 30 (FIG. 1) denotes the gear blank to be cut according to one embodiment of this invention. This blank has its axis at 31; and it is engaged by a plurality of tools 32 which here cut helical teeth 33 on the blank whose tooth profiles are indicated in dotted lines at 34. In this embodiment of the invention there is one tool for each tooth space to be cut in the blank, each tool having side cutting edges 35 and 36 at opposite sides joined by an end or tip cutting edge 37. These cutting edges are formed by the intersection of a cutting face 38 with the side and tip surfaces of the tool. The side and tip surfaces 40 of the tool back of the cutting edges are relieved as usual.

Figures 1, 2, 3, 4, 5, 6, 7, 8:
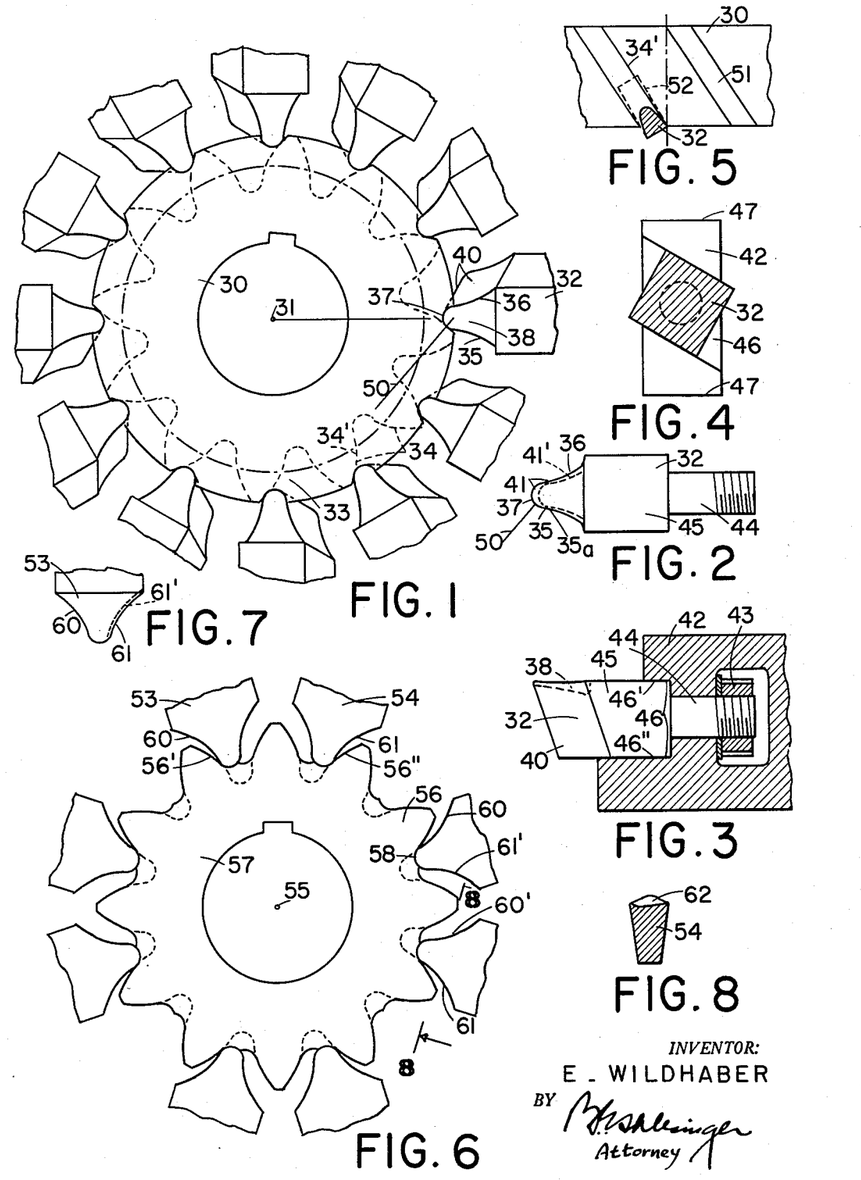
FIG. 1 is an axial view of a gear blank and of a set of tools for cutting helical teeth on said blank and illustrating diagrammatically one embodiment of the present invention.
FIG. 2 is a plan view of one type of form tool that may be used to cut straight or helical teeth according to this invention.
FIG. 3 is a side view of the tool of FIG. 2 and a fragmentary section through the tool holder in which the tool is mounted.
FIG. 4 is a cross section of the tool and an end view of a tool holder for holding the tool to cut helical teeth.
FIG. 5 is a fragmentary development to a plane of the outside periphery of the gear blank, and showing the first phase of depth-cutting helical teeth in the blank, and showing the tool in section in engagement with one of the helical slots being cut in the blank.
FIG. 6 is an axial view of a spur gear blank in engagement with a set of tools positioned in accordance with a modification of the present invention.
FIG. 7 is a front view of a tool, such as may be used in the process of FIG. 6 for cutting one side of the teeth of the blank, and further illustrating the shape of the tool and indicating its relation to the tool for cutting the opposite side of the teeth of the blank.
FIG. 8 is a longitudinal section of this tool taken along the line 8—8 of FIG. 6 looking in the direction of the arrows.

FIG. 2 shows the cutting profile of the tool 32, when the tool is new, in full lines at 41, and shows in dotted lines at 41' how that cutting profile appears after the tool has been sharpened back. Both cutting profiles lie in the relieved surfaces of the tool. The dotted profile 41' has a varying distance from original profile 41 in this view taken in the direction of the cut. This varying distance is a measure of the varying relief on the sides and tip of the tool in a direction normal to the profile portion considered, that is, it is a measure of the inclination of the considered tool surface portion with respect to the surface cut thereby on the workpiece. This effective clearance or relief increases with increasing profile inclination and is a minimum on the side near the outer end of the tool.

Each tool 32 is secured in a tool holder 42 by means of a nut 43 which engages the threaded end of a shank 44 integral with the tool. The shank 44 fits in a bore provided in the holder. Each tool has a square-body portion 45 which fits the sides 46', 46" of a slot 46 provided on the holder 42.

Different tool holders are used for cutting straight teeth and helical teeth. For helical teeth the slot 46 is inclined to the end faces 47 of the tool holder as shown in FIG. 4, the direction of inclination depending upon the hand of the helical teeth to be cut. For straight teeth the slot is parallel to the end surfaces 47.

In operation the tools 32 are gradually fed depthwise toward the axis 31 of the workpiece. In previous practice they are fed radially so that the radial center line of the tool and of the tool profile coincides with the radial center line of the tooth space, which the tool cuts, in all positions of depth feed.

In accordance with the present invention the tools are fed depthwise relative to the workpiece in a direction inclined to the center line of the respective tooth spaces engaged by the tools so that each tool follows one side of a tooth of the gear more than the other. In the embodiment shown in FIG. 1 the tools 32 follow one side 34' of the tooth spaces 33 so that the side cutting edges 35 of the tools do not cut until full depth is reached approximately. During the depth feed the cutting is confined to the side cutting edges 36 and the tip cutting edges 37. In the position shown the edge 37 of one tool, for instance, contacts the profile cut on the side 34' of a tooth side of the workpiece at a point having a contact normal 50 (FIGS. 1 and 2). This normal has a substantial inclination or pressure angle so that the tool has a large normal relief at that point (FIG. 2). The relief increases further toward the outer end of the tool.

In cutting teeth in a process of depth feed, the tool should have enough relief in all feed positions. This is a problem with helical teeth because the lengthwise inclination of the teeth, namely, their helix angle, varies at different radial distances from the work axis. It increases with increase of radial distance, most on pinions, especially pinions with long addendum teeth. Moreover, the tools should clear the sides of the slot cut, even at the increased helix angle.

FIG. 5 illustrates the problem. It shows the slots 51 cut in a gear blank near the start of the operation in the feed position shown in FIG. 1. The tool, as relieved for practicing the present invention, is shown in section in full lines at 32. Dotted lines 52 indicate for comparison a section through an unrelieved tool. The tool is shown set to a helix angle suited to the full depth position, usually the angle of the pitch helix of the gear teeth. The slots 51 cut at the outside of the work piece are more inclined than this tool setting angle. For proper cutting, the tool relief has to be sufficient to clear the side 34' of the tooth slot 51, also. This is accomplished with my invention by giving the side of the tool which cuts that side of the tooth slot a substantial profile inclination, an inclination corresponding to a contact normal such as 50, so that the tool cuts with ample relief. This substantial inclination is effected through the changed direction of depth feed.

When the tool is fed in convention way along the center line of the tooth space engaged thereby, the side portion 35a (FIG. 2) of low pressure angle cuts substantially throughout the depth feed, even near the start of the operation. This is the portion having minimum relief. A conventional tool may not have enough relief at point 35a to avoid interference, or, if given enough relief at that spot, the relief at the tool point may have to be so large as to shorten the tool life to an extent which makes the tool impractical. The present invention, therefore, remedies this serious condition.

It should be noted that the difficulty exists only on one side of the slot 51 of the gear blank. Even an unrelieved tool would clear the other side in this feed position, as shown in dotted lines in FIG. 5. The tool is made to follow the side of lesser clearance in its depth feed. It is the side displaced from the center line of the tooth space in a right hand direction on the left hand gear shown, looking at the cutting faces of the tools. When looking along the work axis at the rear ends of the tools, the tools are made to follow the sides displaced in the left hand direction on a left hand gear and in a right hand direction on a right hand gear. In other words, looking at the rear of the tools, the tools are made to follow the right hand side on a right hand gear and the left hand side on a left hand gear.

In one procedure, both sides are completed when full depth is reached. This side 34' is then produced solely by the end cutting edge 37 in its depth feed along the profile 34'. The side cutting edge 35 can then be omitted if desired, that is, it does not have to be made with a definite shape. In another procedure a side cut is taken by the edge 35 after full depth is reached. In either case, the gears may be shaved in a separate operation after cutting.

The tool holders are preferably mounted on a guide member for radial motion thereon toward and away from the work axis as will be described further hereinafter. The feed motion of the tools 32 is then a combination of a radial feed and an angular feed about the work axis. The angular feed may be performed either by the work or by the guide member.

The tools 32 cut each only with one side cutting edge 36 and the tip cutting edge 37. Here the chips are shorter profilewise less apt to get in each other's way. This improves the cut. Another advantage is the fact that nonsymmetrical cutting faces may be used, which favor said one side cutting edge and the end cutting edge, particularly if the other side cutting edge is never to cut. Even if the other side cutting edge applies a final cut at full depth, nonsymmetrical cutting faces may be used to advantage because the cutting action itself is not symmetrical.

In the process illustrated in FIG. 1 each tool cuts in one tooth space only and no indexing is required.

*Indexing*

Further advantages can be attained when indexing is added, that is, when during each return stroke the work is indexed on its axis so that each tool enters a different tooth space after each stroke of the work.

One obvious feature is the fact that the shape cut is exactly alike on all the teeth regardless of the position of the various tools. A further advantage is the possibility of using fewer tools than there are tooth spaces. This is especially valuable on fine-pitch gears and on internal gears because ample clearance can be provided between the tools.

FIG. 6 illustrates a modification of the invention in which indexing is employed, and in which the tools are fed relative to the work in a direction inclined to the center line of the respective tooth spaces engaged by the tools.

In the method illustrated, a plurality of pairs of tools 53, 54 are provided. The tools 53 are carried by one guide member, and tools 54 are carried by another guide member as is further disclosed in FIG. 18. The two guide members are fed in opposite directions about the work axis 55 during the depth feed so that the tools follow opposite sides of the teeth of the work piece 57. Tool 53 follows tooth side 56', and tool 54 follows and describes tooth side 56". Each tool has a tip cutting edge 58 and side cutting edges 60, 61' and 61, 60', respectively.

FIG. 7 shows the pair of tools superimposed on one another in their full depth positions. The two tools in the aggregate fill a tooth space of the blank. Tool 53 reaches up to one side of the tooth space with its side edge 60 but its opposite side edge 61' is slightly spaced from the opposite side of the tooth space, the opposite side of the tooth space being contacted and cut by the side edge 61 of the tool 54. The latter tool, in turn, has its opposite side spaced a slight distance from the side of the tooth space cut by side edge 60 of tool 53.

FIG. 8 is a section of a tool taken in the cutting direction looking from the tool body toward the point of the tool. It shows a section through the cutting face 62 of the tool which is nonsymmetrical and adapted to the nonsymmetrical cutting action of the tool. However, symmetrical cutting faces may be used if desired.

Each tool cuts with its tip cutting edge 58 and one side cutting edge. Thus the tool 53 cuts with the side cutting edge 61', and the tool 54 cuts with the side cutting edge 60' during the depth feed. The opposite side cutting edges 60 and 61, respectively, are saved for applying a final cut at full depth. In this way the rough cutting is performed by a different portion of the cutting profile from that which produces the final shape of the gear tooth profile; and the last cut is applied with a keen edge because that side cutting edge has no other work to do.

The angular feed of each of the two tool guides is in one direction during the depth feed at a rate which decreases with increasing depth reached by the tools. At full depth the angular feed reverses to take a light final cut with the side cutting edge which has been saved for this cut.

If desired one of the finishing side cutting edges can be made to stand out very slightly above the others so that one edge applies the last cut on one side of all the teeth of the blank.

The gear teeth produced where the tools are indexed are very accurate, so that a satisfactory product can be attained in many instances even without subsequently shaving the gears.

The indexing method is also usable without the final form cut. In this case, the tooth profiles are the result of the feed combination, that is, of the in-feed and the angular feed. The side-cutting edges 60, 61 then do not need to conform exactly to the tooth sides to be cut as long as they do not interfere with them. They may be made circular arcs or straight lines; and the same tools can be used for a range of gears.

*Further embodiments*

Figures 9, 10, 11, 12:
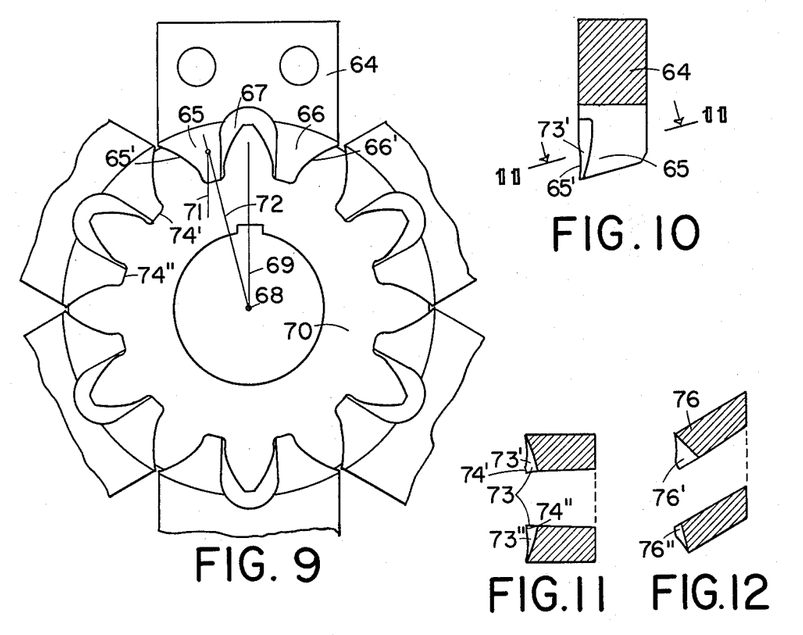
FIG. 9 is an axial view of a nearly completed gear blank showing a further modification of my invention and the form of tools used in carrying out this modification.
FIG. 10 is a cross section of one of the tools shown in FIG. 9, the section being taken along the radius 69 of this FIG.
FIG. 11 is a section through this tool taken on the line 11—11 of FIG. 10 looking in the direction of the arrows.
FIG. 12 is a section similar to FIG. 11 but of a tool constructed according to a modification of this invention for cutting helical teeth.

FIGS. 9 to 11 illustrate an embodiment of the invention in which each cutter 64 has a plurality of cutting teeth or blades 65 and 66, two in the instance illustrated. The cutting teeth or blades 65, 66 apply the tooth shape to the gears with form-cutting edges 65', 66' cutting opposite sides of the gear teeth, respectively. They are the remote cutting edges of the pair of cutting blades 65, 66. A gap 67 separates cutting teeth or blades 65, 66. The adjacent side edges of this gap diverge toward the bottom and do not cut. While the cutter as a whole is fed radially toward the axis 68 of the workpiece, the individual cutting blades 65, 66 are each fed in a direction inclined to the center line of the tooth space engaged thereby. Thus the cutting blade 65 is fed in a direction 71 inclined to the radial center line 72 of the engaged tooth space and parallel to radial line 69; and the cutting blade 66 also feeds in a direction parallel to line 69.

In the embodiment disclosed in FIG. 9, the workpiece is indexed after every cutting stroke. Each tooth space of the work piece is engaged first by one cutting blade of a cutter 64 and in the next stroke by the other cutting blade. When the work is indexed clockwise, the tooth space of the work is engaged first by cutting blade 65 and then by cutting blade 66 of the same cutter.

The cutting faces 73', 73" (FIG. 11) of the cutting blades are preferably positioned to produce front rake and side rake at the tip cutting edges 74', 74" and at the side cutting edges 65', 66' of the cutting blades 65, 66. On cutters for cutting straight teeth the two cutting faces 73', 73" may lie in a common surface of revolution as, for instance, the spherical surface 73 shown in FIG. 11.

The cutting faces 76', 76" of a cutter 76 (FIG. 12) for cutting helical teeth lie in separate surfaces; but these surfaces are also positioned to effect the desired front rake and side rake of the tip and side cutting edges of each blade.

With the described cutter construction keen cutting action is attained; and the cutting action is confined to the tip and one side of each cutting blade. Shorter and thicker chips are attainable in this way, and an improved cutting action.

Figure 13:
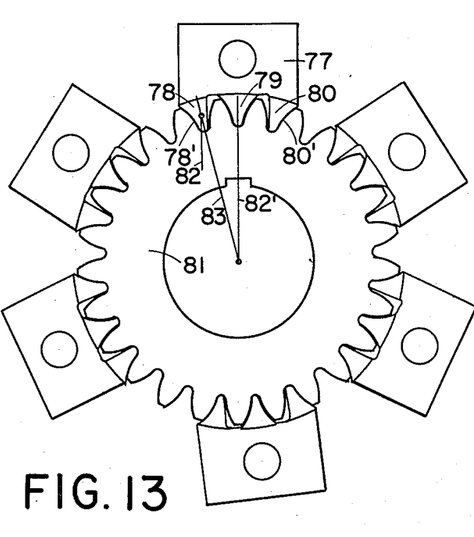
FIG. 13 is an axial view of a nearly completed gear showing tools made according to a still further embodiment of this invention carrying out a still further modification of the invention.
Figure 14:
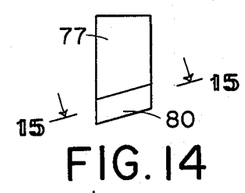
FIG. 14 is a side view of one of the tools of FIG. 13.
Figure 15:
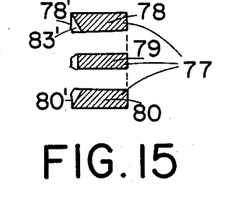
FIG. 15 is a section along the line 15—15 of FIG. 14 looking in the direction of the arrows.

Cutters 77 with three cutting teeth or blades 78, 79, 80 are shown in the embodiment of the invention illustrated in FIGS. 13 to 15 inclusive. They may be used when the workpiece 81 has a great number of teeth. The cutting blades 78 and 80 contain side cutting edges 78', 80' on their distal sides, that is, on their sides furthest away from the center of the cutter, each being fed in a direction inclined to the center line of the tooth space in which it cuts, though the tool as a whole may be fed in the direction of the blank radius 82'. Thus, the cutting tooth 78 is gradually fed depthwise in the direction 82 which is parallel to direction 82' and is inclined to the radial center line 83 of the engaged tooth space. This direction 82 of feed is also inclined to the radial center line of the tooth space engaged by the blade 80. The central cutting blade 79 cuts with its tip only.

Here, also, differently inclined cutting faces 83' (FIG. 15) are provided on the respective cutting teeth or blades, to achieve keen cutting angles at the edges of the cutting blade.

Internal gears

Figure 16:
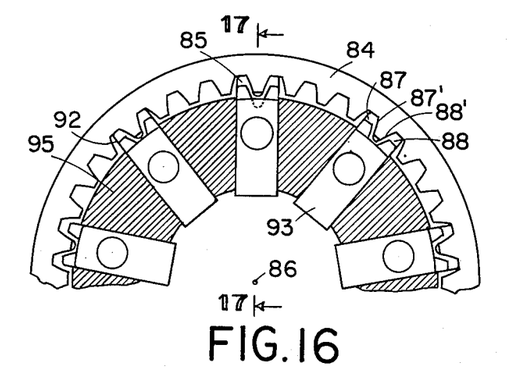
FIG. 16 is an axial view of a nearly completed internal gear in engagement with tools formed and positioned according to a further modification of the invention, the section being taken along the line 16—16 of FIG. 17 looking in the direction of the arrows.
Figure 17:
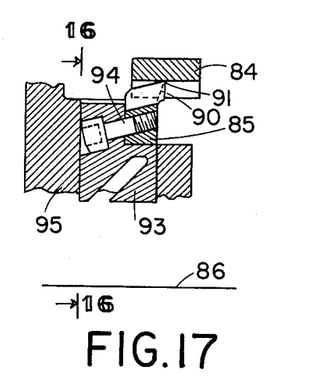
FIG. 17 is a fragmentary axial section taken along the line 17—17 of FIG. 16.

FIGS. 16 and 17 show one way of cutting internal gears 84 in accordance with the present invention, with cutters 85 having two cutting blades each. FIG. 16 is a view taken along the work axis 86 looking at the rear of the tools, while FIGS. 1, 6, 9 and 13 are views looking at the cutting faces.

Here the side cutting edges 87', 88' of the cutting teeth or blades 87, 88 are on adjacent sides. The front cutting faces 90 are preferably positioned to achieve side rake on the side cutting edges 87', 88' and front rake on the tip cutting edges 91. The distal edges 92 of the cutting blades 87, 88 do not cut with their sides. They are in the clear, because, due to the indexing of the blank after each stroke, the two cutting blades 87, 88 cut clearance for each other.

Each cutter 85 is secured to a holder 93 by a screw 94 (FIG. 17) which holder in turn is movable radially in a common guide member 95. Each cutter is advanced into cutting position prior to each cutting stroke, and is completely withdrawn to clear the gear blank after each cutting stroke, as are also the cutters or tools in the other described embodiment of the invention where indexing is employed. The holders 93 are fed along the same guides 95 for depthwise feed.

Machine

Figure 18:
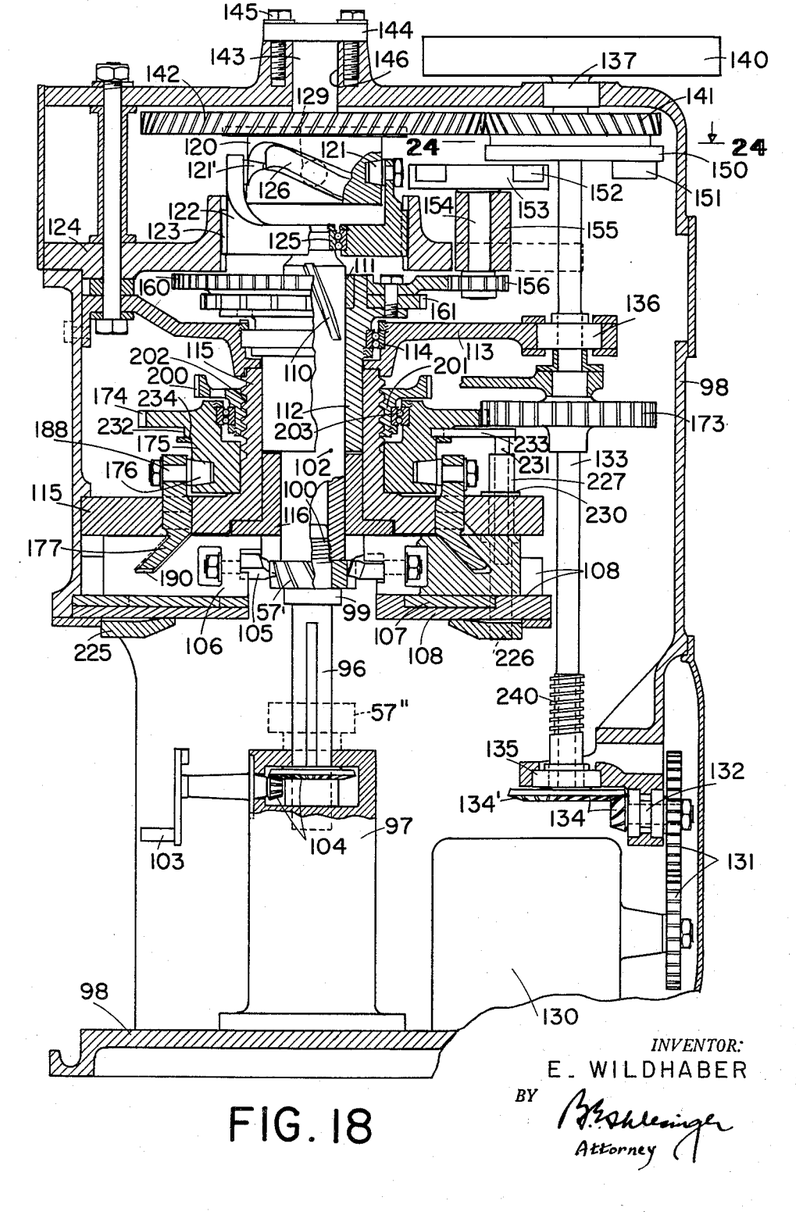
FIG. 18 is a vertical section of a machine for performing the method of the present invention, the section being taken generally axially of the work spindle of this machine.

A simple machine for carrying out the process of the present invention will now be described with reference to FIG. 18.

The machine illustrated has a vertical work spindle 102 and is shown in the process of cutting external helical teeth on a work piece or gear blank 57'. For loading, the work piece is placed on a shaft 96 that is rotatable and axially movable in a column 97 secured to the machine frame 98. The work is chucked on the shaft 96 when the shaft is in its lowest position, its collar 99 then abutting the top of the column 97, as indicated in dotted lines at 57". The blank and the shaft 96 are then raised vertically by power, or by hand; and the threaded upper end 100 of the shaft 96 is brought into engagement with a matching internal thread provided in the work spindle 102 of the machine. This is done by turning the shaft 96 by means of the handle 103 and bevel gears 104. The thread 100 has a hand such that the cutting pressure tends to tighten it. Shaft 96 is thus made rigid with the spindle 102 and serves as an outboard support for the work.

The tools or cutters 105 may be arranged in pairs as described in reference to FIG. 6; and each tool is rigidly secured to a holder 106. The holders of one set of tools are radially movable in one guide member 107 (FIG. 18); and those of the other set of tools are radially movable in another guide member 108. The two guide members are internested and are adapted to be fed about the axis of the work spindle. The upper member 107 consists of a ring portion that has radial and axial projections or ways forming guides for guiding the tool holders 106 radially of the axis of spindle 102. The lower member 108 has axial projections disposed at both sides radially of said ring portion 107, which form guides for the other tool holders 106 to guide said other tool holder radially of the axis of spindle 102. When the tools are arranged in pairs, the two guide members are fed in opposite directions. In other cases, they do not need to be fed at all about the axis of the work spindle, and are then maintained stationary. In a case, such as described with reference to FIG. 1, both guide members may be locked together and fed in one direction only.

The work spindle 102 has helical grooves 110 of the same hand and the same lead as the helical teeth of the work piece. These grooves engage helical projections provided internally in an insert 111 rigid with a hub member 112. This hub member is rotatably mounted in an axially fixed position on parts that are rigid with the machine frame 98. It is mounted on an anti-friction bearing 114, in a plate 113; and the outside surface of the hub member 112, moreover, bears against the bore of the stationary part 115.

The work spindle is guided by the grooves 110; and its cylindrical outside surface moreover is supported in the bore of an insert 116 that is rigidly secured to the stationary part 115. The work spindle is reciprocated by a cam 120 which is engaged by a pair of diametrically opposed tapered rollers 121, 121' mounted to rotate on axes radial of the slidable annulus 122. The annulus 122 is movable axially along the internal splines 123 provided in a stationary part 124 that is rigidly secured to the machine frame. Either straight or helical splines may be used. Helical splines maintain the annulus 122 rigidly in position even when the external splines provided on the annulus 122 are quite short.

The upper end of the work spindle is connected with the annulus 122 through an anti-friction bearing 125 so as to be fixed axially to the annulus while being rotatable therein.

The cutting load is essentially coaxial with the work spindle; and the two rollers 121, 121' provide this load directly without load on the guide surfaces, or approximately so. The use of two diametrically opposite rollers requires that the cam track 126 repeat after every half turn. The cam makes one half revolution per cutting stroke. If desired, counter balance may be provided through a member moving oppositely to the slide or annulus 122, operated by rollers 129 engaging cam 120 and whose axes are at right angles to the drawing plane.

The drive to the work spindle is from a motor 130 through change gears 131 to a short shaft 132, thence to a vertical shaft 133 through a pair of spiral bevel gears 134. The vertical shaft makes one turn per cutting cycle, that is per cutting and return stroke. The vertical shaft 133 is rotatably mounted in bearings 135, 136, 137, the latter being held in the machine frame 98 directly. The bearings 135, 136 are held in parts rigid with the machine frame. At its upper end, the shaft 133 has a fly wheel 140 rigidly secured thereto. Beneath the fly wheel it carries a helical gear 141. The latter meshes with a helical gear 142 at a one to two ratio. Accordingly, each revolution of the shaft 133 produces half a turn of the gear 142 and of the cam 120.

The gear 142 is rigid with the cam 120 and rotatably mounted in an axially fixed position on a stud, whose upper end 143 has a flange 144. This is rigidly secured to the machine frame by screws 145; and by its engagement with the cylindrical bore 146 of the machine frame.

*The index*

Figure 24:
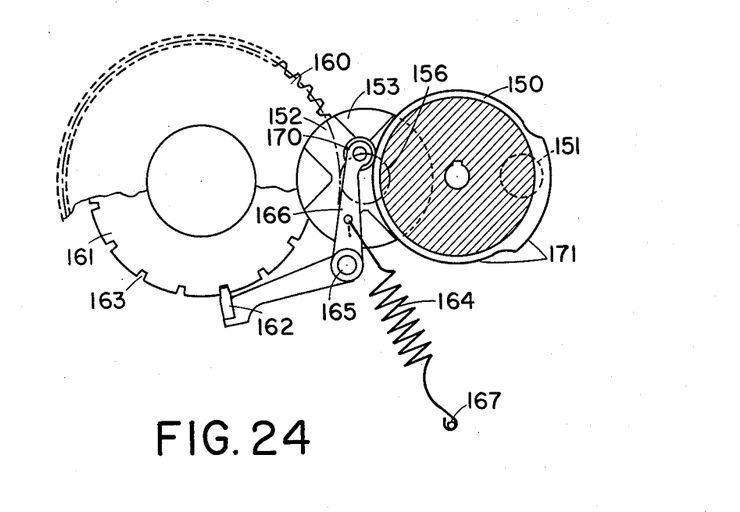
FIG. 24 is a section on the line 24—24 of FIG. 18 looking in the direction of the arrow and showing the index mechanism of the machine, a part being broken away to show the index plate.

Formed integral with the helical gear 141 is a disc 150 carrying a circular projection or roller 151. This projection or roller periodically engages one of the slots 152 of a conventional Geneva wheel 153. FIG. 24 is a view of the index mechanism taken along the axis of the work spindle and of the shaft 133.

In each indexing operation the Geneva wheel is rotated through a quarter turn. The Geneva wheel 153 is secured to a short vertical shaft 154 (FIG. 18) rotatably mounted in a bearing member 155 that is rigidly connected with the machine frame 98. The shaft 154 has a pinion 156 secured to it which meshes with and drives a gear 160 that is secured by screws to the hub member 112. The gears 156 and 160 are change gears. Gear 160 is rigidly secured to an index plate 161 that is also secured to the hub member 112.

When the pin or roller 151 is out of engagement with the Geneva wheel, the hub member 112 is secured in fixed position by a locking pawl 162 (FIG. 24). This pawl engages one of the notches 163 of the index plate 161 and is maintained therein by a spring 164. The pawl 162 is rigidly secured to a vertical shaft 165 that has at its upper end an arm 166 which is rigid with the shaft. The spring 164 is attached at one end to this arm and at its other end to a stationary pin 167.

At its outer end the arm 166 carries a roller 170 that engages a cam track 171, provided on the outside of disc 150. Immediately prior to the engagement of projection or roller 151 with the Geneva wheel 153, the cam track 171 moves the roller 170 of arm 166 so that the locking pawl 162 is lifted from its notch 163, and ceases to lock the index plate 161 and hub member 112. When the projection or roller 151 gets out of engagement with the Geneva wheel, the cam track 171 lets the roller 170 move in again under the urge of spring 164, so that the locking pawl moves into the next notch 163. With this arrangement the work piece is indexed during a quarter of the cutting cycle, during the return stroke.

*Clapping and depth feed*

The vertical shaft 133 also has a pinion 173 rigidly secured to it. This pinion meshes with a gear 174 which is coaxial with the work spindle and rigid with a clapping cam 175. The gear 174 and cam 175 are rotated by pinion 173 through one half turn per turn of shaft 133. Cam 175 is engaged by a pair of diametrically opposite tapered rollers 176 that are rotatably mounted on radial axes on a ring member 177. This member is separately shown in FIG. 19. It is movable axially of the work spindle as the cam 175 is revolved. It has an annular body 180 with a conical outside surface 181 and a conical inside surface 182 of the same cone angle. The two conical surfaces have a common axis 183 coinciding with the axis of the work spindle; and the cone apexes of these two surfaces are at 184 and 185, respectively. This annular member also contains two opposite projections 186 having parallel plane sides 187. The rollers 176 are mounted on bolts 188 (FIG. 18) secured to these projections.

Figure 19:
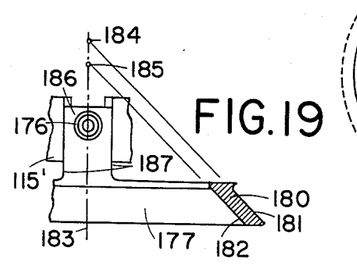
FIG. 19 is a fragmentary axial section of the annular member in the machine that operates the clapping motion and the tool feed.

The parallel sides 187 of the projections are engaged by a stationary part 115' rigid with the machine frame (FIG. 19). Through this engagement the circular part 177 is held against turning during axial movement. Instead of this arrangement a straight or helical spline engagement could be provided if desired, as described in connection with circular slide or annulus 122.

The conical surfaces 181 and 182 of ring member 177 engage the outer and inner sides respectively of inclined slots 190 provided on the tool holders 106. The holders are thereby constrained to move radially upon axial displacement of the ring member 177. As the ring member moves down the holders move in and as the ring member moves up, the holders move out. In this way the clapping motion of the tools is effected, the annular member 177 being moved down just prior to the cutting stroke, and being moved up again after completion of the cutting stroke. This vertical and axial motion of ring member 177 is effected by cam 175 and rollers 176.

Depthwise feed of the tools into the tooth spaces of the gear blank is achieved by moving the clapping cam 175 axially together with its drive gear 174, and together with rollers 176 and ring member 177. In FIG. 18, the cam is shown in its lowered position. The tool holders and tools move outwardly of the tooth space as the clapping cam 175 is lifted vertically.

The vertical position of the clapping cam is controlled by a ratchet wheel 200 (FIG. 22) whose hub 201 (FIG. 18) is internally threaded and engages an external thread 202 provided on stationary part 115. When the ratchet wheel 200 is turned in one direction it also moves down. When it is turned in the opposite direction it moves up. The member containing the clapping cam 175 and gear 174 is connected with the ratchet wheel through an antifriction bearing 203 which is adapted to take axial thrust loads in both directions. The clapping cam thus moves vertically with the ratchet wheel.

Figure 22:
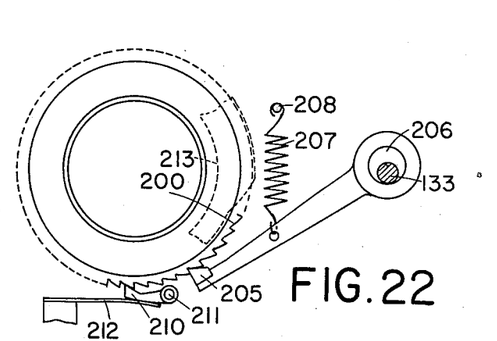
FIG. 22 is a somewhat diagrammatic view of the ratchet feed mechanism of the machine looking along the axis of the ratchet wheel shown in axial section in FIG. 18.

The ratchet wheel is intermittently turned by a pawl 205 (FIG. 22) that is moved by an eccentric 206 which is rigid with vertical shaft 133. The pawl is maintained in engagement with ratchet wheel by a spring 207 attached to a stationary pin 208. The ratchet wheel is advanced a step on each return stroke of the work spindle. FIG. 22 shows the ratchet wheel in motion. It is prevented from turning in the opposite direction by a pawl 210 mounted on a stationary pin 211 and kept in engagement with the ratchet wheel by a spring 212.

After the cutting process is completed the ratchet wheel has to be turned back to its starting position. In principle, this can be done by hand after first disengaging the pawls 205 and 210 by moving a cam member, indicated in dotted lines at 213, about the axis of the ratchet wheel. However, any suitable known automatic return may be used; the return means forms no part of the present invention.

Figure 20:
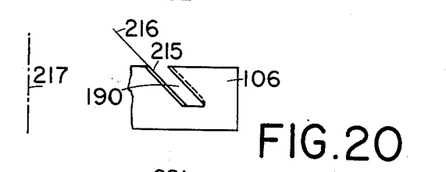
FIGS. 20 and 21 are fragmentary views of a tool holder such as may be employed with the member shown in FIG. 19, and illustrating the shape of the outside and inside surfaces, respectively, of the tool holder which engage the inside and outside surfaces, respectively, of the annular member.

FIG. 20 illustrates the shape of the inner surface of slot 190 in each tool holder 106. It is an external conical surface 215 whose straight line generators 216 are inclined at the same angle to its axis 217 as on the internal conical surface 182 of part 177. It matches the conical surface 182 of ring member 177 in the innermost position of the tool holder.

Figure 21:
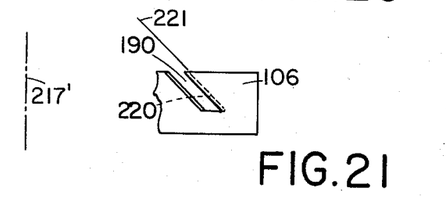

FIG. 21 illustrates the shape of the outer surface of the slot 190. It is an internal conical surface 220 whose straight line generators 221 are inclined at the same angle to its axis 217' as on the external conical surface 181 of the part 177. It matches the external conical surface 181 of the ring member 177 in the outermost position of the tool holder.

In the extreme positions illustrated in FIGS. 20 and 21 the axes 217, 217' coincide with the axis 183 of the work spindle.

*Clamping*

The tool holders are preferably clamped against movement radially of the work spindle during the cutting strokes. This is done by pressing a ring 225 (FIG. 18) upwardly so that the tool holders are clamped between the guide members 107, 108 and the stationary part 115. The ring 225 is engaged by the threaded ends 226 of a plurality of tubular members 227 that are equally spaced about the axis of the work spindle. Each tubular member has a flange 230 resting on the stationary part 115. Each member 227 is intermittently turned back and forth on its axis by a rod 231 that fits into the tubular member and has a sliding key connection with it. Thus, the tubular member turns with the rod 231 that is axially movable therein. The turning motion of each rod 231 is controlled by a cam track 232 provided on the cam member 175. The cam track 232 engages the end of an arm 233 that is formed integral with each rod 231. Each rod 231 is held between a disc 234, that is secured to the member 175, and a shoulder provided on the gear 174, so that it moves axially with the gear 174 and slides then in the tubular member.

Figure 23:
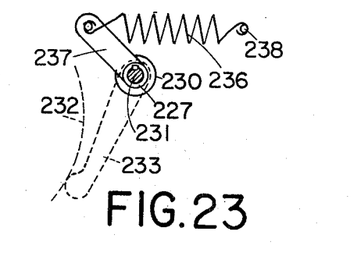
FIG. 23 is a fragmentary view taken downwardly in the direction of the work axis and showing details of the mechanism for clamping the tool holders.

Arm 233 is pressed toward the cam track 232 by a strong spring 236 (FIG. 23) which is attached to an arm 237 provided on each tubular member 227. The opposite end of each spring is attached to a stationary pin 238. Preferably the spring 236 moves the associated tubular member 227 in a direction to effect clamping of the tool holder, and the cam track 232 is used for unclamping. In the clamped position, then, the arm 233 is close to but does not touch the cam track. It is moved out and turned for unclamping. The threads at the lower ends 226 of the tubular members is then of such hand that the ring 225 is moved up to clamping position when the tubular members 227 are turned by the associated springs 236.

*Angular feed*

Figure 25:
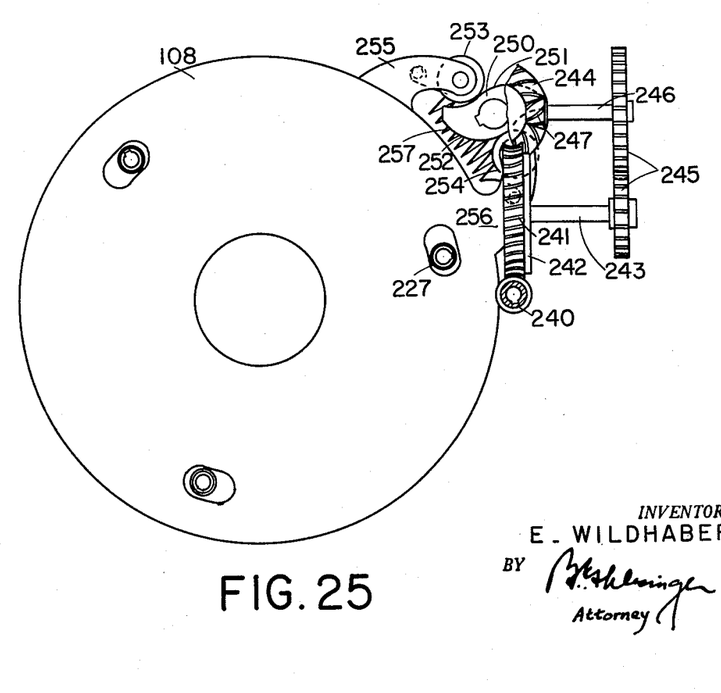
FIG. 25 is a bottom view of the two guide parts of the tool holders showing only the movable parts thereof, and illustrating a way of effecting their equal and opposite angular feed.

The angular feed of the guide members 107 and 108 about the axis of the work spindle will now be described with reference to FIGS. 18 and 25. What will particularly be described is the case where the two guide members are fed equally in opposite directions.

Formed integral with spiral bevel gear 134' (FIG. 18) is a worm 240 that meshes with a worm wheel 241 (FIG. 25) which is secured to the flange 242 of a shaft 243. This shaft drives a spiral bevel gear 244 through a pair of change gears 245, a shaft 246, and a spiral bevel pinion 247. A cam 250 with two tracks 251, 252 is rigidly connected with the spiral bevel gear 244. The two tracks engage rollers 253 and 254, respectively, rotatably secured to the projecting arms 255 and 256, respectively, of the guide members 107, 108, respectively.

The rollers are kept in engagement with the cam 250 by a spring 257 attached at opposite ends to the two arms 255, 256 and drawing them together. The position of the cam shown in FIG. 25 corresponds to full depth position of cut in the gear blank. The cam turns very slowly and provides a gradually decreasing rate of angular feed. While the cam tends to supply a very slow but continuous motion, its operation is slightly retarded by the clamping of the tool holders, and occurs during the return strokes of the work spindle, when the parts are unclamped.

If desired, by properly shaping the cam tracks, a feed reversal may be provided at full depth. If desired, a cam may be used instead, that makes one complete revolution per cutting operation.

The cam 250 should be returned to starting position prior to each cutting operation, that is, prior to starting on another gear blank. This is preferably done mechanically, but could be done by hand, after disconnecting the wormwheel 241 from the flange 242, and turning the shaft 243 without turning the wormwheel. It can also be done by taking off one of the change gears 245.

The swinging cam 250 permits of changing the tooth shape by changing the ratio of the gears 245, and also by setting the cam 250 to a different starting position.

*General*

The machine shown is intended for large scale production. To change the machine over to a different job with a different tooth number, the index plate 161 and the change gears 156, 160 should be changed. If the stroke required is substantially different, the cam 120 should also be changed. When the gear diameter is substantially different the tool holders 106 should be replaced by tool holders with their inclined slots 190 in a different position. If angular feed of the guide members is used, the cam 250 (FIG. 25) may also have to be replaced.

While all this is practical in large production runs it would be objectionable on small lots. It should be understood that the machine described serves as an example only. It is a machine kept simple at the expense of flexibility. More complicated and more flexible machines can, of course, be devised for carrying out the method of the present invention.

Many modifications can be made without departing from the spirit of the invention. While the invention has been described, then, in connection with certain specific embodiments thereof, it will be understood that it is capable of further modification; and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. The method of cutting a cylindrical gear which comprises engaging with a gear blank a tool that has a side cutting edge at one side shaped complementary to the profile shape desired on one side of a tooth space of the gear, effecting reciprocation between the tool and blank lengthwise of the teeth to be cut in the blank, effecting relative depthwise feed between the tool and blank in a direction inclined to the center line of the tooth space which is engaged by the tool so that the tool follows more said one side of the tooth space than the other and so that in full depth cutting position said side cutting edge will coincide with the profile of said one side of the tooth space, describing said one side of the tooth space from end to end with said side cutting edge in full depth cutting position, and then withdrawing the tool from the tooth space and turning the blank on its axis to position the tool to cut in another tooth space of the blank as recited.

2. The method of cutting a cylindrical gear which comprises engaging with a gear blank a tool having a concave side cutting edge at one side shaped complementary to the profile shape desired on one side of the teeth of the gear, said tool having also a tip cutting edge, effecting reciprocation between said tool and the gear blank lengthwise of the teeth to be cut in the blank, turning the blank on its axis so that the tool enters a different tooth space of the blank with each cutting stroke, effecting relative depthwise feed between said tool and the blank along said one side of each tooth while maintaining the tip cutting edge only of the tool in contact with said one side of the teeth and describing said one side of each tooth from end to end with said concave side cutting edge of the tool in the final position of depth feed thereby to apply a form cut to said one side of the teeth.

3. The method of cutting cylindrical gears which comprises engaging a plurality of tools, each of which has a side-cutting edge, with a gear blank at at least three different angularly-spaced points around the blank axis so that the tools cut simultaneously in three different tooth spaces of the blank, effecting reciprocation between said tools and the blank lengthwise of the teeth to be cut in the blank, turning the blank on its axis so that each tool enters a different tooth space on each cutting stroke, effecting relative depthwise feed between said tools and said blank in a direction inclined to the center line of the tooth space engaged by each of said tools during its cutting stroke, and finish-cutting the side surfaces of the teeth of the blank from end to end with the side-cutting edges of the tools in the final positions of depth feed in the tooth spaces thereby applying form cuts to the sides of the teeth of the gear.

4. The method of cutting cylindrical gears which comprises engaging a plurality of tools, each of which has a side-cutting edge, with a gear blank at at least three different angularly-spaced points around the blank axis so that the tools cut simultaneously in three different tooth spaces of the blank, reciprocating said gear blank in the direction of the teeth which are to be cut therein to effect cutting and return strokes, turning the gear blank on its axis so that each tool enters a different tooth space of the blank on each cutting stroke of the blank, feeding the tools depthwise toward the axis of the blank in a direction inclined to the center line of the tooth spaced engaged by each of said tools on a cutting stroke, and finish-cutting the side surfaces of the teeth of the blank from end to end with the side-cutting edges of the tools in the finish positions of depth feed thereby applying form cuts to the sides of the teeth of the gear.

5. The method of form-cutting helical teeth on cylindrical gears which comprises engaging a plurality of tools with a gear blank at at least three different angularly-spaced points around the blank axis so that the tools cut simultaneously in three different tooth spaces of the blank, each of said tools having a cutting edge that matches and is a counterpart of the tooth surfaces to be cut thereby, reciprocating the blank in a helical path about and along its axis, and feeding each of the tools depthwise toward the axis of the blank in a direction inclined to the center line of the tooth space engaged by each tool so that said cutting edge of each tool follows more one side surface of the tooth space in which it is engaged than the other side surface of this tooth space, said one side surface being the right hand side surface of the tooth space on a right hand helical gear and the left hand side surface of the tooth space on a left hand helical gear, looking along the blank axis at the rear of a tool.

6. The method of cutting cylindrical gears which comprises engaging a plurality of tools with a gear blank at different points angularly spaced about the blank axis so that the tools cut simultaneously in different tooth spaces of the blank, said tools having front cutting faces and side-cutting edges formed at the junctures of the front faces of the tools with the sides of the tools, the cutting faces of different tools being differently inclined to their sides and different tools have side-cutting edges at opposite sides, effecting reciprocation between said tools and the blank lengthwise of the teeth to be cut in the blank to effect cutting and return strokes, turning the blank on its axis between cutting strokes so that each tool engages a different tooth space on successive cutting strokes and each tooth space is cut by all the tools, and effecting depthwise feed between the tools and the blank in a direction inclined to the center line of the tooth space which is engaged by each tool on each cutting stroke.

7. The method of form-cutting helical teeth on a cylindrical gear which comprises engaging a plurality of tools with a gear blank so that the different tools will cut simultaneously in different tooth spaces of the blank, each of said tools having a cutting edge that matches and is a counterpart of the tooth surfaces to be cut thereby, reciprocating the blank lengthwise in the direction of and about its axis, and relatively feeding each of said tools depthwise toward the axis of the blank in a direction inclined to the center line of the tooth space engaged by each of said tools, said depthwise feed being composed of a feed radially of the axis of the blank and of turning motion about said axis, at least one of the components of said feed being performed by the tools.

8. The method of cutting teeth on a cylindrical gear which comprises engaging a plurality of tools with a gear blank so that the different tools will cut simultaneously in different tooth spaces of the blank, said tools comprising two groups adapted to cut opposite sides of the teeth, respectively, reciprocating the blank lengthwise of the teeth to be cut therein to effect cutting and return strokes, turning the blank on its axis so that each tool enters a different tooth space on each cutting stroke, and effecting relative depthwise feed between the tools and blank in a direction inclined to the center line of the tooth space engaged by each tool, said feed comprising a radial motion toward the axis of the blank formed by the tools, and a relative turning feed motion about said axis, said turning feed motion being in opposite directions for the two groups of tools.

9. The method of cutting teeth on a cylindrical gear which comprises engaging a plurality of tools with a gear blank so that the different tools engage the blank at points angularly spaced about the axis of the blank, each of said tools comprising a plurality of form-cutting blades arranged side by side and adapted to engage different tooth spaces of the blank simultaneously, reciprocating the blank lengthwise of the teeth to be cut therein to effect cutting and return strokes, turning the blank on its axis between cutting strokes so that each cutting blade enters a different tooth space on each cutting stroke, and feeding each tool radially toward the axis of the blank so that some at least of the cutting blades of each tool are fed in a direction inclined to the center line of the tooth space in which the cutting blade is cutting.

10. The method of cutting teeth in a cylindrical gear which comprises engaging a gear blank with a plurality of pairs of cutting blades that are angularly spaced about the axis of the blank, the two cutting blades of a pair being rigid with each other and being sharpened to have side cutting edges at their distal sides to form-cut opposite sides of the teeth of the blank, respectively, reciprocating the blank lengthwise of the teeth to be cut therein to effect cutting and return strokes, turning the blank on its axis so that each cutting blade enters a different tooth space on each cutting stroke, and feeding the pairs of cutting blades depthwise in a direction such that the two cutting blades of a pair are feed in directions inclined oppositely to the center line of the tooth space engaged by each blade.

11. Apparatus for form-cutting helical gear teeth on a cylindrical gear blank comprising a rotary work support, a plurality of tool holders spaced about the axis of said work support, means for effecting reciprocatory motion between said work support and said tool holders in the direction of and about the axis of the work support, means for effecting straight line depthwise feeding motion between said work support and each of said tool holders in a direction inclined to a line radial of the axis of the work support, and means for effecting relative feed motion between said work support and said tool holders about the axis of the work support in time with said depthwise feed motion.

12. Apparatus for form-cutting helical teeth on cylindrical blanks, comprising a rotatable work support, a plurality of tool holders spaced about the axis of the work support, means for reciprocating the work support axially and simultaneously oscillating it about its axis, means for feeding said tool holders toward the axis of the work carrier and for withdrawing said tool holders radially of said axis to effect clapping of the tool holders, and means for effecting a relative feed motion between said tool holders and said work support about the axis of the work support in time with the first-named feeding means and at a varying ratio therewith, the rate of the last-named feeding motion decreasing with increasing depth of cut.

13. The method of cutting cylindrical gears which comprises engaging with a gear blank a form-cutting tool which has a side-cutting edge shaped complementary to the shape of tooth surfaces which are to be cut on the gear, effecting relative reciprocation between the tool and the blank in the direction of the teeth to be cut in the blank to effect cutting and return strokes, turning the blank on its axis so that the tool enters a different tooth space of the blank of each cutting stroke, feeding the tool depthwise relative to the blank in a direction inclined to the center line of the tooth space being cut by the tool, and finish-cutting the side surfaces of the blank from end to end with said side-cutting edge of the tool in full depth feed position.

14. The method of cutting cylindrical gears which comprises engaging with a gear blank a tool which has two cutting blades that are rigid with one another and that are adapted to cut in different tooth spaces of the blank simultaneously, said blades having side cutting edges, respectively, shaped to cut opposite sides of the teeth of the blank, said side cutting edges being at the distal sides of the two blades, effecting relative reciprocation between the tool and the blank to effect cutting and return strokes, turning the blank on its axis so that the tool enters a different tooth space of the blank on each cutting stroke, and feeding the tool depthwise relative to the blank in a direction radial of a tooth of the gear blank intermediate the tooth spaces in which the cutting blades are cutting, so that each cutting blade is fed in a direction inclined to the center line of the tooth space in which the blade is cutting, and finish-cutting the side surfaces of the teeth of the blank from end to end with said side-cutting edges of the tool when the tool is in full depth cutting position.

References Cited in the file of this patent

UNITED STATES PATENTS

| | | |
|---|---|---|
| 1,392,361 | Sears | Oct. 4, 1921 |
| 1,451,097 | Kitto et al. | Apr. 10, 1923 |
| 1,953,969 | Miller | Apr. 10, 1934 |
| 2,248,168 | Gleason | July 8, 1941 |
| 2,329,804 | Wildhaber | Sept. 21, 1943 |
| 2,346,867 | Pelphrey | Apr. 18, 1944 |
| 2,374,901 | Sneed | May 1, 1945 |
| 2,438,329 | Wildhaber | Mar. 23, 1948 |
| 2,474,393 | Cobb | June 28, 1949 |
| 2,668,480 | Christman | Feb. 9, 1956 |